US009954951B2

(12) United States Patent
Pellarin

(10) Patent No.: US 9,954,951 B2
(45) Date of Patent: Apr. 24, 2018

(54) COMMUNICATION METHOD AND DEVICE FOR REMOTE CONTROL OF AN ACTUATOR FOR MOBILE EQUIPMENT IN A BUILDING

(71) Applicant: SOMFY SAS, Cluses (FR)

(72) Inventor: Florent Pellarin, Pringy (FR)

(73) Assignee: SOMFY SAS, Cluses (FR)

( * ) Notice: Subject to any disclaimer, the term of this patent is extended or adjusted under 35 U.S.C. 154(b) by 757 days.

(21) Appl. No.: 14/376,395

(22) PCT Filed: Jan. 30, 2013

(86) PCT No.: PCT/FR2013/050181
§ 371 (c)(1),
(2) Date: Aug. 1, 2014

(87) PCT Pub. No.: WO2013/114035
PCT Pub. Date: Aug. 8, 2013

(65) Prior Publication Data
US 2014/0379137 A1 Dec. 25, 2014

(30) Foreign Application Priority Data

Feb. 2, 2012 (FR) ...................................... 12 50967

(51) Int. Cl.
*G01M 1/38* (2006.01)
*H04L 29/08* (2006.01)
(Continued)

(52) U.S. Cl.
CPC .............. *H04L 67/12* (2013.01); *G05B 19/00* (2013.01); *G08C 17/02* (2013.01)

(58) Field of Classification Search
CPC ....................................................... H04L 67/12
(Continued)

(56) References Cited

U.S. PATENT DOCUMENTS 6,437,692 B1 * 8/2002 Petite ..................... G01D 4/004
340/3.1
2002/0010615 A1 * 1/2002 Jacobs ................... G06Q 10/02
705/7.15
(Continued)

FOREIGN PATENT DOCUMENTS

WO    2005119621 A1    12/2005
WO    2011063182 A1    5/2011

OTHER PUBLICATIONS

Werner-Allen, Geoffrey, et al. "Deploying a wireless sensor network on an active volcano." IEEE internet computing 10.2 (2006): pp. 18-25.*

(Continued)

*Primary Examiner* — Satish Rampuria
(74) *Attorney, Agent, or Firm* — Cantor Colburn LLP

(57) ABSTRACT

A communication method and device for remote control of an actuator for mobile equipment in a building. The present invention concerns an operating method of a communication device (DC) for remote control of an actuator (ACT) for a piece of mobile equipment (ME) in a building, comprising the steps consisting of receiving a first signal (RS) according to a determined configuration communication mode (MCi), defining an operational communication mode (MUO) on the basis of at least a portion of the content of the first received signal (RS), receiving a second signal (RS2) according to the operational communication mode (MUO), and interpreting the second received signal (RS2) according to the operational communication mode (MUO), in such a way as to identify control data in the second received signal (RS2). The invention also concerns a method for configuring a communication device of an actuator, and a communication device and a tool for configuring said device.

13 Claims, 5 Drawing Sheets

(51) Int. Cl.
*G08C 17/02* (2006.01)
*G05B 19/00* (2006.01)

(58) Field of Classification Search
USPC .................................................. 700/275–306
See application file for complete search history.

(56) References Cited

U.S. PATENT DOCUMENTS

| | | | | |
|---|---|---|---|---|
| 2004/0010575 | A1* | 1/2004 | Wookey | H04L 41/0896 709/223 |
| 2004/0064566 | A1* | 4/2004 | Striemer | G06Q 30/0261 709/228 |
| 2004/0225713 | A1* | 11/2004 | Abbasi | H04L 29/06 709/203 |
| 2008/0221718 | A1* | 9/2008 | Nielsen | G05B 19/042 700/90 |
| 2011/0199918 | A1* | 8/2011 | Sampath | H04W 8/005 370/252 |

OTHER PUBLICATIONS

Helal, Sumi, et al. "The gator tech smart house: A programmable pervasive space." Computer 38.3 (2005): pp. 64-74.*
Schenato, Luca, et al. "Foundations of control and estimation over lossy networks." Proceedings of the IEEE 95.1 (2007): pp. 163-187.*
International Search Report dated May 2, 2013 re: PCT/FR2013/050181; citing: WO 2011/063182 A1 and WO 2005/119621 A1.
International Search Report dated Apr. 5, 2013 re: PCT/FR2013/050182; citing: WO 2011/063182 A1 and WO 2005/119621 A1.

\* cited by examiner

|    | BF1 | BF2 | BF3 |
|----|-----|-----|-----|
| P1 | MC1 | MC2 | MC3 |
| P2 | MC4 | MC5 | MC6 |
| P3 | MC7 | MC8 | MC9 |

COMMUNICATION METHOD AND DEVICE FOR REMOTE CONTROL OF AN ACTUATOR FOR MOBILE EQUIPMENT IN A BUILDING

TECHNICAL FIELD

The present invention relates to a communication device for the remote control of an actuator for a building mobile equipment such as a roller shutter, a blind or a curtain and a configuration method of such a device.

BACKGROUND

It is known to use a communication device comprising a receiver and a data processing unit intended to receive a signal coming from the receiver and process this received signal as a frame of a communication mode.

Such a type of known device allows in particular carrying out the remote control of an actuator for a building mobile equipment, particularly of the closing type, for example a door, a gate or a window, or of the sun protection, the multimedia projector screen or even the ventilation hatch type.

Different existing types of communication protocols allow carrying out such a remote control. Particularly, the document EP1696402 describes such a type of protocol. Protocols known under the names corresponding to registered trademarks RTS®, Io-homecontrol®, Z-wave® or Zigbee® are also used for these purposes.

It appears however that the frequency bands usable in different countries or regions for a communication on the basis of the aforementioned protocols are distinct. Thus, each device is specific to one type of protocol and one determined frequency band, and is thus specific to a country or a given region.

This absence of harmonization of authorized and thus usable radio-frequencies between countries leads to the manufacture of the products specific to each country so that this product communicates on the authorized frequency band.

A production strategy of this type tends to segment the production of the product batches, each batch being specific to an area corresponding to a set of countries or regions that use the same types of frequency bands and/or protocols, and to use different product references for each distinct batch.

This results in an increase in the costs and the complexity of the manufacture of the products, given the significant number of batches and their small size. Similarly the product testings are multiplied by the number of batches. Finally, a significant non-moving stock is constituted because a batch can only be sold in the area specific to it, and it is not possible to you use the stock of a given batch to compensate for an exceptional request concerning a different area.

BRIEF SUMMARY

The purpose of the present invention is to solve all or part of the aforementioned drawbacks.

To this end, the present invention relates to a functioning method of a communication device for the remote controlling of an actuator for a building mobile equipment comprising:

a) receiving a first signal according to a determined configuration communication mode, b) defining an operational communication mode depending on at least part of the content of the first received signal, c) receiving a second signal according to the operational communication mode, d) interpreting the second received signal in accordance with the operational communication mode, so as to identify control data in the second received signal.

Thanks to the arrangements according to the invention, the communication device presents two distinct functioning modes, a functioning mode called configuration functioning mode and a functioning mode called operational functioning mode.

The operational functioning mode corresponds to the interpretation of the received signals (from a remote control or from a dedicated tool) as commands to be executed by the actuator, for example "up", "stop", "down", or as information from sensors, or even as error reports received at the remote control or the dedicated tool.

In the case of the bi-directional communication devices, the operational functioning mode can also correspond to the emission by the actuator of the signals comprising reports of the execution of the commands.

The communication mode with the remote control or with the dedicated tool, used by the device during the implementation of the operational functioning mode is called operational communication mode.

The configuration functioning mode aims at defining the operational communication mode.

The communication mode with the remote or with the dedicated tool, used by the device during implementation of the configuration functioning mode is called configuration communication mode.

Parameterization or reconfiguration of the operational communication mode used by the device is possible, by allowing therefore the use of a same type of device for multiple operational communication modes.

By way of example, for a device being part of an actuator for a building mobile equipment, the method can be implemented during an operation carried out during the installation of the actuator on site, for example end of travel adjustment or pairing. The operational communication mode of the device can be modified again carrying out the steps of method during an update, a reset, a maintenance or parametrization phase of the device.

The incident signals that allow identifying the operational communication mode to be used can be provided by a dedicated configuration tool. The device uses this reference to define its own operational communication mode.

Thanks to the arrangements of the invention, a decrease in the number of device references can be obtained, which allows an optimized manufacturing of the products. Adapting products to new communication modes is also carried out easier. Indeed, It is sufficient to introduce new parameters corresponding to new communication modes during the programming of the communication device. In this way, the communication device has several selectively usable communication modes.

According to one aspect of the invention, the distinct communications modes correspond to different types of communications protocols.

According to one aspect of the invention, the distinct communications modes correspond to communications on distinct frequency bands.

According to one aspect of the invention, the definition of the operational communication mode uses characteristics, in particular the frequency band to be used and the type of communication protocol, contained in the signal received according to the configuration communication mode.

This definition of the operational communication mode can be qualified as explicit, because the defining parameters of the communication mode are defined directly from the information contained in the received signal according to the configuration communication mode.

According to one aspect of the invention, the definition of the operational communication mode comprises an emission step by the communication device of a third signal comprising a list of operational communication modes likely to be implemented by the communication device, and a reception step by the communication device of a fourth signal containing an selection indication of the operational communication mode among the operational communication modes likely to be implemented by the communication device.

According to one aspect of the invention, the definition of the operational communication mode comprises a step of downloading the defining parameters of the operational communication mode.

It should be noted that such a downloading may intervene during the first downloading of the software on the device, during a first use or during a configuration of the device, then including an update of the software and/or data to be integrated into the device.

For the implementation of a functioning mode which requires only a change of radio-frequencies, the tool transmits to the communication device the information necessary for the programming of the radio circuits.

This information varies depending on the hardware version of the communication device. The information concerning this hardware version can be obtained by a direct response to the configuration tool if the communication device is bidirectional, or by another return channel such as motion sequences of the motor, or by labeling of the actuator.

The parameters of the operational communication mode can be transmitted for example in the form of a predefined table or a sequence of pairs (address, value) corresponding to the addresses of the registers mapped on the memory of the communication device and to the values to be written at these addresses.

The default values of the registers are configured for a functioning in the (or one of the) configuration communication mode(s).

According to one aspect of the invention, the definition of the operational communication protocol comprises a step of downloading all or part of a software component.

Therefore, a new software, comprising a new protocol stack (Pj), can be downloaded by the tool.

This downloading concerns in particular all or part of the application software component intended to the interpretation of the operational communication mode.

These arrangements allow minimization the software elements and the data to be integrated to the device before its first use.

For example, a communication device at the output of production can only contain a software component corresponding to the configuration communication mode. This device thus cannot work operationally before downloading the application software performed at installation by a secure tool and/or by an authorized person. In these conditions, a stolen actuator during storage cannot be used.

The communication device may be informed of the passage into the downloading phase of a new software via a predefined sequence, for example:

Motor stop control,
Emission by the configuration tool of a signal according to a predefined sequence.

Alternatively, the tool can send a specific command to ask the communication device to pass into the downloading phase.

The communication device may erase the application software recorded in the rewritable memory and keep only the downloading software. This downloading software, also known as "boot loader" allows a reliable transmission of the new application software intended to the interpretation of the operational communication mode, for example using packets of predefined size (512 bytes); the correct reception of these packets can be confirmed by the communication device, which sends an acknowledgment message to the tool.

If the device is installed and uses, for its operational functioning, functional parameters to be reused after the downloading, the downloading method may comprise a saving sub-step of these parameters prior to the downloading and a restoration step of the parameters subsequent to the downloading.

According to one aspect of the invention, several configuration communication modes are usable, and a listening of the signals received according to the plurality of configuration communication modes is performed.

According to one aspect of the invention, the compatibility of the received signal with a selected configuration communication mode is checked. In particular, according to one aspect of the invention, an error check code of a received signal frame is calculated, or, according to another aspect of the invention, the conformity of a received signal sequence with the preamble of a frame belonging to the protocol type corresponding to the selected configuration communication mode is checked.

Such arrangements allow checking simply the conformity of the received signal with a selected configuration communication mode, based in particular on the recognition of the preamble of a protocol frame. The recognition of this preamble allows confirming that the radio-frequency decoding, the decoding of the binary elements, the flow rate and/or the signal sequence are compliant with that of the selected configuration communication mode, which in most cases is sufficient for its characterization.

According to one aspect of the invention, the determination of a configuration communication mode for the communication device comprises:

a') Selecting a particular configuration communication mode from among a plurality of configuration communication modes usable by the communication device, b') Waiting for the reception of a signal during a determined time interval c') If no signal is received within the determined time interval, returning to step a') of selecting a particular communication mode by selecting another configuration communication mode among the plurality of configuration communication modes usable by the communication device d') If a signal is received within the determined time interval, proceeding to an attempt of interpretation of the received signal according to the selected configuration communication mode e') If the received signal is compliant with the selected configuration communication mode, determining said selected configuration communication mode as determined configuration communication mode of the device f') If the received signal is not compliant with the selected communication mode, returning to step a') of selecting a particular configuration communication mode by selecting another configuration communication mode among the plurality of configuration communication modes usable by the communication device.

The present invention also relates to a method of configuration of a communication device for the remote control of an actuator for building mobile equipment comprising:

a") defining an operational communication mode to be used by the communication device;

b") generating at least one signal according to a configuration communication mode, the content of which comprises information related to the operational communication mode to be used by the communication device.

This method can be implemented by a remote control or by a dedicated configuration tool.

According to one aspect of the invention, the signal generated according to the configuration communication mode comprises the characteristics of the operational communication mode, and in particular the frequency band to be used and/or the type of communication protocol.

According to one aspect of the invention, the configuration method comprises a sub-step of receiving a third signal comprising a list of operational communication modes likely to be implemented by the communication device and a sub-step of emitting a fourth signal containing an indication of selection of the operational communication mode in the list of the operational communication modes likely to be implemented by the communication device.

According to one aspect of the invention, step a") of defining the operational communication mode comprises a step of receiving by the configuration tool a list of operational communication modes likely to be implemented by the communication device.

According to one aspect of the invention, step b") of generating at least one signal according to a configuration communication mode comprises a step of downloading defining parameters of the operational communication mode to the device.

According to one aspect of the invention, step b") of generating at least one signal according to a configuration communication mode comprises a step of downloading the software component to the device.

According to one aspect of the invention, a step of selecting a configuration communication mode is performed.

The present invention also relates to a communication device for the remote control of an actuator for a building mobile equipment comprising a receiver and a data processing unit intended to receive a signal from the receiver and to treat this received signal as a frame of a communication mode (of configuration or operational), the communication device being arranged to implement a functioning method as described above.

As already mentioned, the device has a first configuration functioning mode, corresponding to the first steps a) and b) of the functioning method and a second operational functioning mode, corresponding to steps c) and d) of the method, wherein the operational communication mode is used for receiving control signals or reception reports.

According to one aspect of the invention, the processing unit is arranged in order to implement its configuration functioning mode during first use of the device.

According to one aspect of the invention, the processing unit is arranged in order to configure the receiver so as to allow reception in a determined frequency band.

According to one aspect of the invention, the device comprises an electrical power supply unit arranged so as to provide an electrical power supply, the output characteristics of which are independent of the input characteristics, in particular a battery supply or a switch-mode power supply.

In other aspects of the invention:

The receiver allows communication at frequencies ranging between 200 MHz and 1 GHz.

The receiver allows communication at frequencies ranging between 500 MHz and 1 GHz.

It is also possible that the used frequency bands are discontinuous, for example with a first frequency band around 433 MHz and a second around 868 MHz.

According to one aspect of the invention, the device comprises a transmitter, the processing unit being arranged to configure the transmitter when appropriate.

In the case where the device comprises a transmitter, a configuration is performed for the transmitter. This configuration allows parametrizing the communications in return of the device to a source in the case of a bidirectional protocol. The configuration parameters of the transmitter can be defined from the content of the received frames according to the configuration communication mode or deduced from the configuration of the receiver.

According to one aspect of the invention, the receiver uses communication by radio-frequency waves.

The present invention also relates to an electromechanical actuator for a building mobile equipment comprising a communication device as described above, a motor, and a control unit able of being distinct or confound with the processing unit, the control unit being arranged to control the motor depending on the signals received by the receiver according to the operational communication mode.

The present invention also relates to a bidirectional remote control for the remote control of an electromagnetic actuator comprising a communication device as described above.

The present invention also relates to a configuration tool of a communication device for the remote control of an actuator for a building mobile equipment, arranged for the implementation of a configuration method as described above and comprising a transmitter and a processing unit.

The present invention also relates to an assembly comprising a communication device as described above and a configuration tool arranged to allow the selection of one or more configuration communication mode(s) and of an operational communication mode and to generate at least one frame according to the at least one configuration communication mode.

BRIEF DESCRIPTION OF THE DRAWINGS

In any case, the invention will be better understood by means of the following description, with reference to the accompanying schematic drawings showing, by way of a non-limiting example, several embodiments of a device according to the invention as well as several modes of implementation of the methods according to the invention.

DETAILED DESCRIPTION

Figure 1:
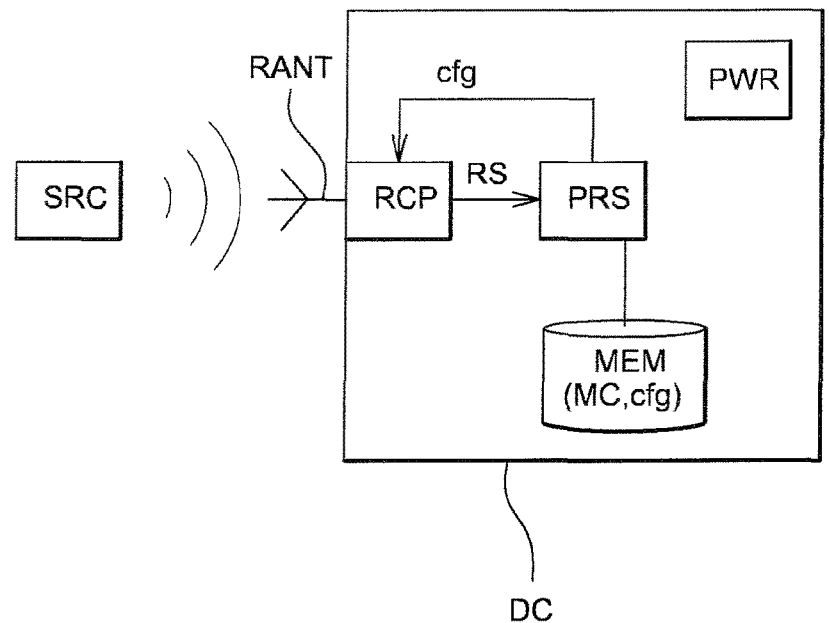
FIG. 1 is a representative diagram of a first embodiment of a device according to the invention.

According to an embodiment shown in FIG. 1, a communication device DC according to the invention comprises a receiver RCP, associated with a receiving antenna RANT and a data processing unit PRS intended to receive and process signals coming from the receiver RCP.

The receiver RCP is in this embodiment an analog radio-frequency receiver or a digital radio-frequency receiver, for example in the case where a protocol of the RTS® type must be taken into account.

The processing unit is arranged so as to interpret received signals according to at least one configuration communication mode MCi and according to a plurality of operational communication modes MUk usable by the communication device DC.

Figure 5:
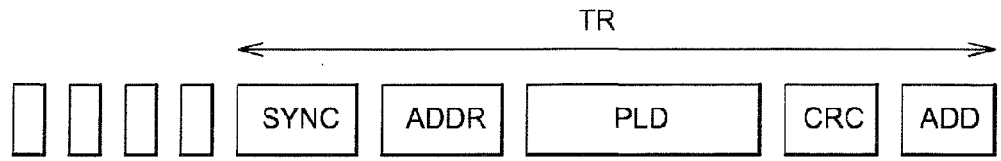
FIG. 5 illustrates an example of frame format that can be used as part of the control of an actuator of building mobile equipment.

We mean by communication mode MCi or MUk here the use of a particular communication protocol Pj in a particular frequency band BFk, as illustrated in FIG. 5. Of course, the number of usable communication protocols and the number of frequency bands may vary according to the embodiments. The different communication modes are symbolized by using an index i, j or k and thus by designating the communication modes such as modes MCj, MUk, j and k that may vary from 1 to p, to facilitate explanation. Similarly, the different protocols P and the frequency bands BF may be represented with an index. The references MC, MU, BF and P, however, may be used depending on the case with or without indexes.

Thus, the distinct communication modes MCj, MUk may correspond to different types of communication protocols Pi, namely for example the communication protocols RTS®, Io-homecontrol®, Zigbee® or Z-wave®.

Similarly, the distinct communication modes may correspond to communications on distinct frequency bands BFm.

It appears that the receiver RCP, which is for example a radio-frequency receiver, is able to function on several frequency bands BFk, for example frequency bands defined around the following nominal frequencies 433/868/915/960 MHz. The antennas RANT equipping the receiver are not always effective on all of the considered frequencies. In this case, types of device DC may be provided for distinct frequency bands, for example, a device functioning for the frequency bands BF ranging between 315 and 433 MHz, and a device functioning for the frequency bands BFk ranging between 868 and 960 MHz.

When using an antenna functioning on all of the frequencies, the same device can be used on all of the frequencies.

For example, in the frequency band between 868 MHz and 960 MHz: the called band "ISM" at 868 MHz is used in Europe, the band at 915 MHz is used particularly in the USA, and the band at 960 MHz is used in Israel.

In addition to the frequency bands and to the type of protocol, other parameters can characterize the communication modes MCj, MUk, in particular all of the commands CMD understandable by the device as well as the parameters PRM related to each of these commands.

As indicated in FIG. 1, the processing unit PRS is arranged to configure the receiver RCP so as to allow a reception in a frequency band BF. Therefore the different technical values of the configuration parameters cfg of the receiver RCP allow it to function on different frequencies for a given type of antenna. These parameters are stored in a memory MEM associated with the processing unit PRS. The processing unit further comprises other elements not represented such as in particular a clock circuit allowing calculation of time-outs.

The device further comprises an electrical power supply unit PWR arranged in order to provide an electrical power supply, the output characteristics of which are independent of the input characteristics, in particular a battery power supply or a switch-mode power supply.

The use of a switch-mode power supply allows the use, downstream of this power supply, identical components whatever the input voltage of the switch-mode power supply. These arrangements allow making the device compatible with the power grid of the country in which it is installed. A switch-mode power supply can be used in particular when the device is integrated into an actuator as we will detail below. In the case of the integration of the device into a bidirectional remote control as will also be detailed, cells or batteries can provide power supply, the characteristics of which are independent of the local power grid.

The functioning of the communication device DC will now be described. As already mentioned, the communication device DC has two distinct functioning modes, a first configuration functioning mode F1 and a second operational functioning mode F2.

The processing unit PRS is arranged to implement its first configuration functioning mode F1 particularly in the following cases:
- during the first powering-on of the device, in particular in factory mode;
- on the initiative of an installer, during the installation or an update on site, in particular during a maintenance operation, or during a regulatory change, corresponding for example to authorized new communication protocols or new frequency bands.
- on the initiative of a user, during an update by means of an Internet connection to a server and a human-machine interface which can be integrated into the device or which can be remote.
- during an update triggered by the software embedded in the processing unit, the triggering of the update being caused by an event such as a detection of an error in the functioning of the actuator or even during a self-test performed by the software.

In this first configuration functioning mode F1, the processing unit PRS is arranged so as to receive a received signal RS by the receiver RCP according to a configuration communication mode MCi and to define an operational communication mode MUO depending on to the content of the received signal RS according to the configuration communication mode MCj.

It should be noted that according to a first embodiment of the invention, a single configuration communication mode MC is defined. In this case, the format of the received signals is interpreted in an unequivocal way according to this unique configuration communication mode.

According to a second embodiment of the invention, several configuration communication modes MCj can be interpreted by the device.

Under these conditions, the processing unit PRS is arranged so as to analyze received signals RS by the receiver RCP coming from a source SRC so as to identify whether at least one sequence of a first received signal RS can be interpreted as being compliant with a communication mode MCj among the plurality of configuration communication modes MC1 to MCp usable by the communication device DC.

An example of a frame of a communication mode usable for controlling a building mobile equipment is described with reference to FIG. 5.

Such a frame TR is introduced for example by synchronizing pulses, and comprises:
- logical synchronization data SYNC, that allow detecting the beginning of the frame,
- addressing data ADDR that allow identifying the transmitter and/or the recipient(s) of the frame,
- data constituting a payload PLD, the content of which depends on the type of the performed command/operation,
- data related to an error check code, for example a cyclic redundancy code CRC,
- optional additional data ADD, comprising for example an encryption key.

Depending on the used type of frame, the number of fields, their length and their content may change. It is thus possible to identify whether a frame is compliant with a given protocol and is a valid frame, for example by comparing the conformity of a sequence of the received signal RS with the preamble comprising the synchronization data SYNC of a frame belonging to the type of protocol Pj corresponding to a particular communication mode.

The recognition of this preamble allows confirming that the radio-frequency decoding, the decoding of the binary elements, the flow rate and the sequence of the signal are compliant with that of the selected communication mode, which in most cases is sufficient for its characterization.

It is also possible to carry out a calculation of an error check code, and to compare the result of the calculation with the value of the error check code CRC comprised in the frame, or to check whether the length of the frame and the format thereof corresponds to a given type of protocol. Other characteristics concerning the frequency, the modulation, the flow rate of the received signal, which are characteristic of a given type of protocol, can be analyzed by the processing unit.

The application of the measures defined above thus allows carrying out the characterization of a particular configuration communication mode MCj in the case where the device is arranged to process signals according to several of these modes.

Subsequently to the recognition of a signal and the interpretation of its content according to a configuration communication mode, a determination of the operational communication mode that should be used in the second functioning mode F2 is performed. This determination may be performed according to various alternative embodiments.

According to a first alternative embodiment, the content of the received frame received according to the configuration communication mode comprises all of the defining parameters of the operational communication mode. Therefore, the type of protocol Pl and the frequency band BFm are defined in the fields of the received frame according to the configuration communication mode MCj, for example in the fields of command CMD, and/or parameters PRM of the received frame.

In a second alternative embodiment, an exchange can be established between the configuration tool SRC and the device DC for determining the operational communication mode MUO.

Therefore, in the first instance, the configuration tool SRC will send a request message to determine the operational communication modes MUk likely to be implemented by the communication device DC. Alternatively, if the desired operational communication mode MUO is not present in the communicated list, a downloading of all or part of the parameters defining a new operational communication mode can be triggered to the device DC.

For the implementation of a functioning mode which requires only a change of radio-frequencies BF, the tool transmits to the communication device the information necessary for programming radio circuits.

It should be noted that this information will vary depending on the hardware version of the communication device. The tool can obtain the information concerning this hardware version by a direct response if the communication device is bidirectional, or by another return channel such as motion sequences of the motor, or by a labeling of the actuator.

The radio parameters can be transmitted in predefined tabular form or by a sequence of pairs (address, value) corresponding to the address registers mapped on the memory of the communication device and to the values to be written at these addresses.

The default values of the registers are configured for a functioning in the (or one of the) configuration communication mode(s).

According to a third alternative embodiment, it is possible that a simple downloading of all or part of the parameters defining a new operational communication mode is triggered to the device DC, or even of all or part of the software component intended for the interpretation of the operational communication mode, without prior implementation of an interrogation of the communication modes likely to be implemented by this device.

Alternatively, a new software, comprising a new protocol stack Pj, can be downloaded by the tool.

The communication device may be informed of the passage into the downloading phase of new software via a predefined sequence for example:
- Motor stop control
- Emission by the tool of a signal according to a predefined sequence.

Alternatively, the tool can send a specific command to ask the communication device to pass into downloading phase.

The device may erase the application software recorded in its rewritable memory and keep only the downloading software. This software, called "boot loader" allows the reliable transmission of the new application software, for example by using packets of predefined size (512 bytes); the correct reception of these packets is confirmed by the communication device, which sends an acknowledgement message to the tool.

If the device is installed and uses for its functioning functional parameters to be reused after downloading, the downloading method may comprise a sub-step of saving of these parameters prior to the downloading and a step of restoring the parameters, subsequently to the downloading.

According to these different alternative embodiments, following the selection of an operational communication mode MUO, the commands to be used and/or the possible command parameters related to these commands can optionally be defined by a communication with the configuration tool SRC.

It should be noted that the source SRC comprises for example a configuration tool. Such a tool preferably comprises interface means for an operator allowing the selection of the operational communication mode MUO to be used by a communication device DC, as well as the configuration communication mode MCj to be used. The tool, which can be of a similar aspect to that of a remote control allow emitting signals, for example due to the pressing of a control button, these signals corresponding to the determined configuration communication mode.

The functioning of the processing unit PRS corresponding to the implementation of a method, the steps of which are described below with reference to FIGS. 6 and 7.

Figure 6:
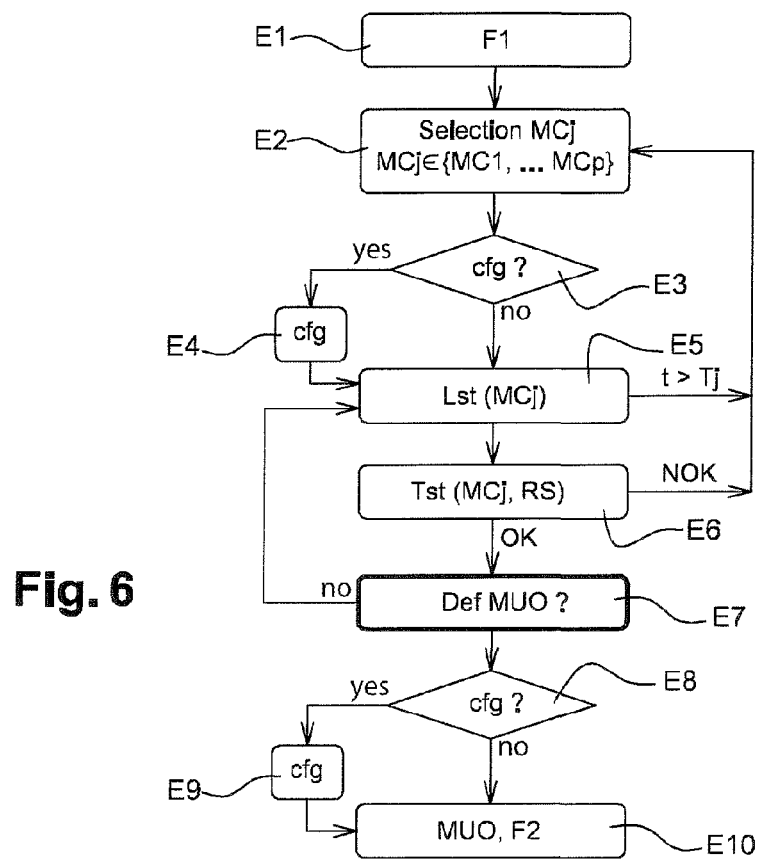
FIG. 6 is a flowchart of a functioning method according to the invention.

The mode of implementation described in FIG. 6 corresponds to an alternative in which several configuration communication modes MCj are likely to be implemented by the communication device DC.

As shown in FIG. 6, in a first step E1, the first functioning mode F1 is selected with the ultimate goal of determining an operational communication mode MUO to be used.

In a second step E2, a first configuration communication mode MCj is selected from among a plurality of communication modes MC1 to MCp which can be processed by the communication device DC.

In a third step E3, a test is performed to identify whether a configuration change of the receiver component RCP is necessary for the functioning in this configuration communication mode MCj.

If the response is positive, a fourth step E4 of configuration is performed. Otherwise, the fifth step E5 is performed.

In the fourth step E4, the technical configuration parameters cfg of the receiver component RCP are set by the processing unit PRS, which stores in a memory MEM these parameters for each configuration communication mode MCj. The configuration is in particular necessary when the current communication mode MCj corresponds to a frequency band BFK different from that of the previously used communication mode or during the first use of the communication device DC.

In a fifth step E5, a listening operation Lst is performed in order to capture a signal possibly sent by a source SRC. This listening step ends when a signal RS is received or when a determined period of time Tj has elapsed without reception of a signal. In the case where a signal RS is received, a sixth step is performed. In the case where a predetermined period of time Tj has elapsed without reception of a signal, the second step E2 of selecting a different configuration communication mode is performed.

In the sixth step E6, a testing operation is performed for identifying whether the received signal RS is likely to be interpreted as compliant with the configuration communication mode MCj, as described above.

If the test result is positive, a seventh step E7 is performed. If the test result is negative, the second step of selecting a different configuration communication mode is performed.

In the seventh step E7, the definition of the operational communication mode MUO is performed based on the received signal RS and interpreted in conformity with the configuration communication mode MCj. This seventh step will be described later in more detail with reference to FIG. 7.

If an operational communication mode MUO has been defined in this seventh step, an eighth step E8 is performed. In the opposite case, the fifth step E5 of listening is performed again.

In the eighth step E8, a test is performed to identify whether a configuration change of the receiver component RCP is necessary to take into account the operational communication mode MUO.

If the response is positive, a ninth step E9 of configuration is performed. Otherwise, the tenth step E10 is performed.

In the ninth step E9, the technical configuration parameters cfg of the receiver component RCP are set by the processing unit PRS, which stores in a memory MEM these parameters for each operational communication mode MUk. The configuration is in particular necessary when the defined operational communication mode MUO corresponds to a frequency band BFK different from that of the previously used communication mode.

In the tenth step E10 the operational communication mode MUO is selected as a communication mode to be used by the communication device DC in an operational functioning mode F2. In this functioning mode F2, the communication device DC is arranged to interpret the received signals RS2 as control signals in accordance with the operational communication mode MUO defined in the configuration functioning mode F1.

Figure 7:
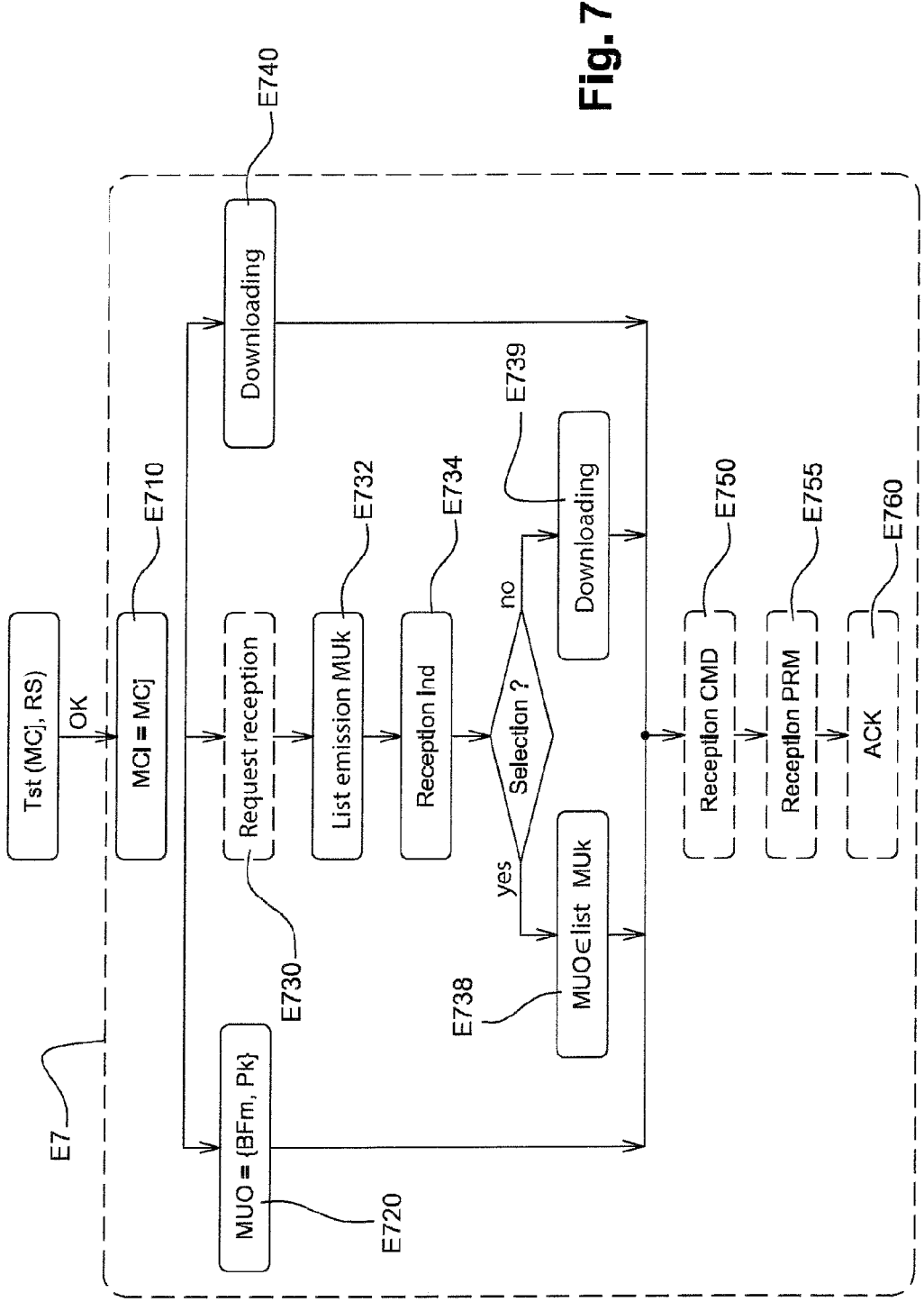
FIG. 7 is a flowchart representing the step of selecting by a communication device of an operational communication mode according to various implementation modes of a method according to the invention.

We will now describe in detail the seventh step E7 of the method described in FIG. 6, with reference to FIG. 7. It should be noted that on FIG. 7, some steps are shown in dotted lines to indicate their optional nature.

FIG. 7 shows the implementation of the seventh step E7 of definition of the operational communication mode MUO. Various implementation modes of the method are shown in this figure.

Following step E6, if the signal RS is compliant with the selected configuration communication mode MCj, this communication mode MCj is determined as a determined configuration communication mode MCi in a step E710. Then, the operational communication mode MUO is performed differently for different alternative implementations of the method.

According to a first implementation alternative of the method, in a step E720, the operational communication mode MUO is determined by the content of the received signal RS, which comprises the set of defining parameters thereof. Thus, the type of protocol PI and the frequency band BFm are defined in the fields of the frame(s) received in accordance with the determined configuration communication mode MCi, for example in the payload PLD.

According to a second implementation alternative of the method, a step E730 is executed wherein the communication device DC interprets the received signal RS as a request sent by the configuration tool SRC bound for the device to recognize the operational communication modes likely to be implemented MUk by the communication device DC. Note that the request can be contained explicitly in the first received signal RS, or that the conformity of at least part of the first received signal RS, for example the preamble, with the determined configuration communication mode MCi, can be interpreted by the communication device DC as a request from the configuration tool SRC.

In the second instance, at a step E732, the communication device DC emits a third signal T83 comprising a list of operational communication modes likely to be implemented MUk by the communication device DC.

In a third instance, the communication device DC receives, during a step E734, a fourth signal RS4 containing an indication of selection of the operational communication mode MUO from among the operational communication modes that are likely to be implemented MUk by the communication device DC.

In a fourth instance, in a step E736, a test is performed to determine whether the performed selection corresponds to an operational communication mode MUk likely to be implemented by the communication device DC.

If the performed selection corresponds to an operational communication mode MUk likely to be implemented by the communication device DC, the selection is taken into account in a step E738.

Alternatively, if the desired operational communication mode MUO is not present on the communicated list, in a step E739, a downloading of a new application software and/or of all or part of the parameters defining the new operational communication mode MUO can be triggered to the communication device. The downloaded parameters may correspond for example to parameters in order to take into account a new frequency band BFm, a new protocol Pk, new commands CMD or new control parameters PRM.

It should be noted that the provision or the update of the commands and/or the parameters corresponds to concrete cases, for example in the following situations: the regulation concerning the speed to adopt subsequently to an obstacle detection can be different depending on the countries of installation; it is also desirable to proceed to the activation of certain commands only when the corresponding option has been paid by the end user.

According to a third implementation alternative, in a step E740, a simple downloading of all or part of the parameters defining the new operational communication mode MUO and/or the corresponding application software is triggered to the device DC.

This downloading can be in particular triggered without prior achievement of an interrogation of the communication modes taken into account by this device.

It should be noted that step 740 may comprise the reception of several frames carrying indications to perform a full downloading of the application software.

For example, a first frame may thus contain an indication of passage into downloading mode, then the following frames can contain file segments and the addresses to store these file segments, then a last frame containing an indication of end of downloading.

According to these different alternative embodiments, following the selection of the operational communication mode MUO, the commands to be used in a step E750 and/or parameters relating to these commands in a step E755 can be optionally defined by a communication with the configuration tool SRC, the device confirming in a last step E760 the correct reception of data related to the operational communication mode MUO. Alternatively, the reception of the commands or parameters can be performed after the passage into the operational functioning mode F2.

Figure 8:
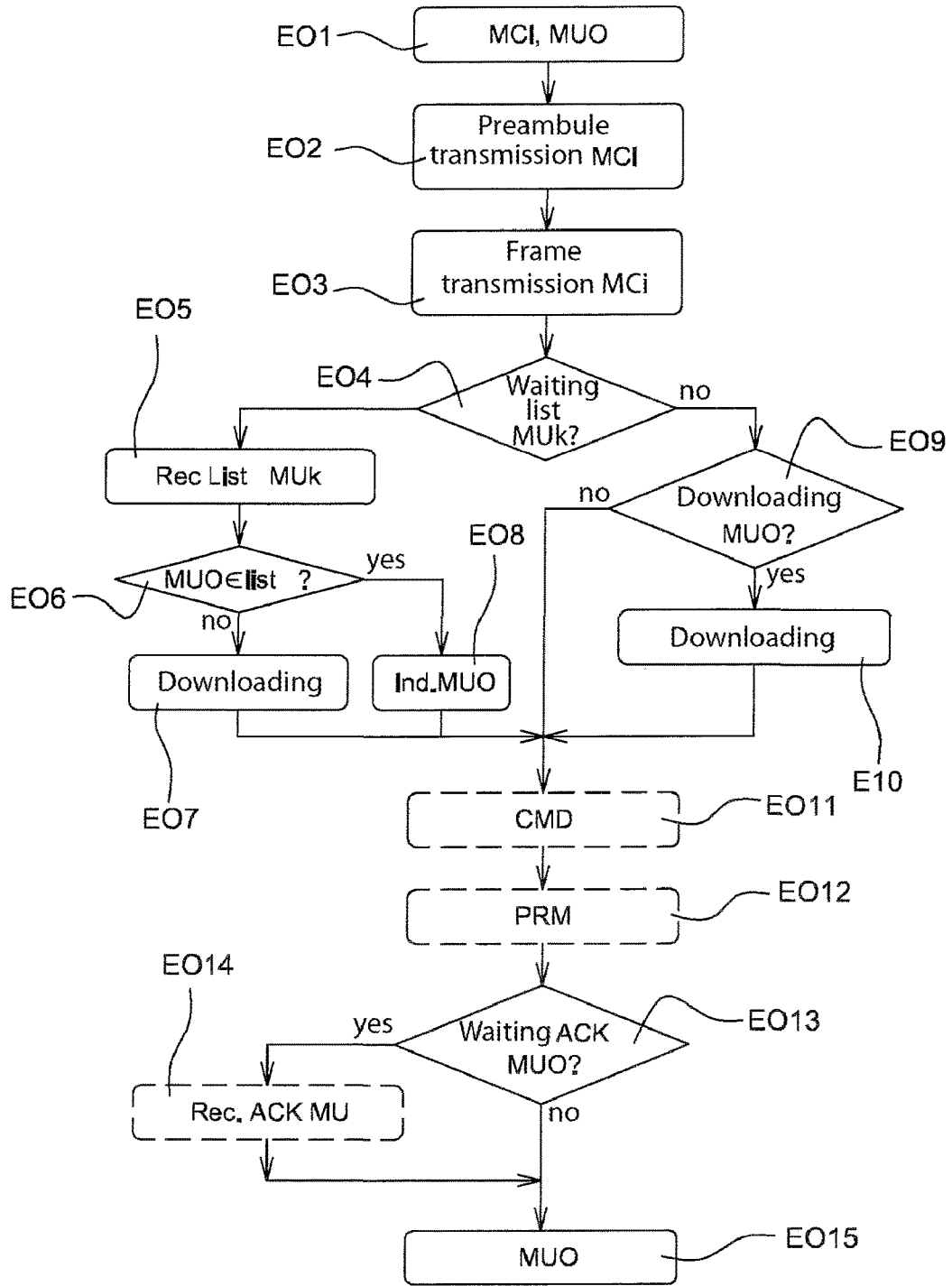
FIG. 8 is a flowchart representing a flowchart of a configuration method implemented by a tool configuration of a device according to the invention.

We will now describe with reference to FIG. 8 the functioning of the configuration tool SRC during the exchanges with the communication device DC in the configuration functioning mode F1, this functioning corresponding to the implementation of a configuration method. It should be noted that in FIG. 8, some steps are shown in dotted lines to indicate their optional nature.

In a first step EO1, a selection of the configuration communication mode MCi and an operational communication mode MUO is performed. Note that the selection of the operational communication mode MUO can be performed later, as will be explained afterwards.

In a second step EO2, a transmission of a signal containing the preamble of a frame according to the configuration communication mode MCi is performed.

In a third step EO3, a transmission of the frame according to the configuration communication mode MCi containing information on the operational communication mode MUO is performed.

According to a first alternative embodiment, in a fourth step EO4, a waiting list of operational communication modes MUk likely to be implemented by the communication device DC is observed.

Then in a fifth step EO5, the list of operational communication modes MUk likely to be implemented by the communication device DC is received from the communication device DC.

In a sixth step EO6, we check whether the selected operational communication mode MUO is present on the list received from the device. If this is not the case, the configuration tool SRC may make another selection of the operational communication mode MUO in the list provided by the communication device DC.

Note that the configuration tool SRC can wait for the reception of this list in order to select the operational communication mode MUO, Then, in an eighth step EO8, an indication of the mode MUO selected in the list is provided to the device.

Alternatively, in a seventh step EO7, if the selected operational communication mode MUO is not present in the list of the communication modes MUk likely to be implemented by the communication device and if the configuration tool SRC does not perform a new selection in this list, at least one signal RS containing the downloading data related to this operational communication mode MUO is sent to the device.

According to a second alternative after step EO4, the list of the communication modes likely to be implemented by the communication device DC is not provided by the device, and a direct downloading of the defining parameters of the operational communication mode MUO and/or of a software component is performed in steps EO9/EO10.

This downloading concerns in particular all or part of the software component intended for the interpretation of the operational communication mode MUO.

According to the first or the second alternative, subsequently to the selection of an operational communication mode MUO, the commands to be used, in a step EO11, and/or the parameters relating to these commands, in a step EO12, are transmitted by the configuration tool SRC to the communication device DC. Alternatively, the transmission of the commands or parameters can be performed after the passage into the operational functioning mode F2.

Then, optionally, in a step EO13, the confirmation of the correct reception of data related to the operational communication mode MUO can be expected. Finally, the operational communication mode MUO is confirmed as being the operational communication mode in an optional step EO15.

Regarding the selection of the configuration communication mode(s), the following elements are to be considered:

By selecting only one configuration communication mode MC, for any country, for example at a frequency of 868 MHz and a frame format of the RTS type, a simple solution is obtained, which can be used for the first loading of the software, the setting up of the devices requiring only the loading of a configuration communication mode in their embedded software;

By selecting a configuration communication mode by geographical area, such as a mode for the United States, a mode for Europe, a mode for Asia, it appears that the device can "deduce" from the used configuration communication mode supplementary information on the protocols and used frequency bands, depending on the data stored in its memory;

By selecting a configuration communication mode by frequency group, namely, for example a first group comprising the frequencies 315/433 MHz and a second group comprising the frequencies at 868/915/960 MHz, it is possible to use antennas presenting an improved sensitivity by frequency group.

It should be noted that it is advantageous to select a limited number of configuration communication modes, so that the duration of emission of the preamble of a frame is greater than the sum of the listening time periods Tj for all of the configuration communication modes MC1 to MCp.

It is furthermore possible to select the configuration communication mode depending on:

the site, for example in the case of installation in an existing network.

a listening to the RF environment, in order to select a configuration communication mode ensuring optimum transmission quality.

The selection of the configuration communication mode can finally be performed:

by the user, via a human-machine interface available on the tool;

by connection to a remote server, for example by accessing a database, possibly depending on the location of the tool.

It is also possible to anticipate that the set of the configuration communication modes of the tool corresponds to the set of the possible operational communication modes, in order to perform only one production configuration by product.

Figure 2:
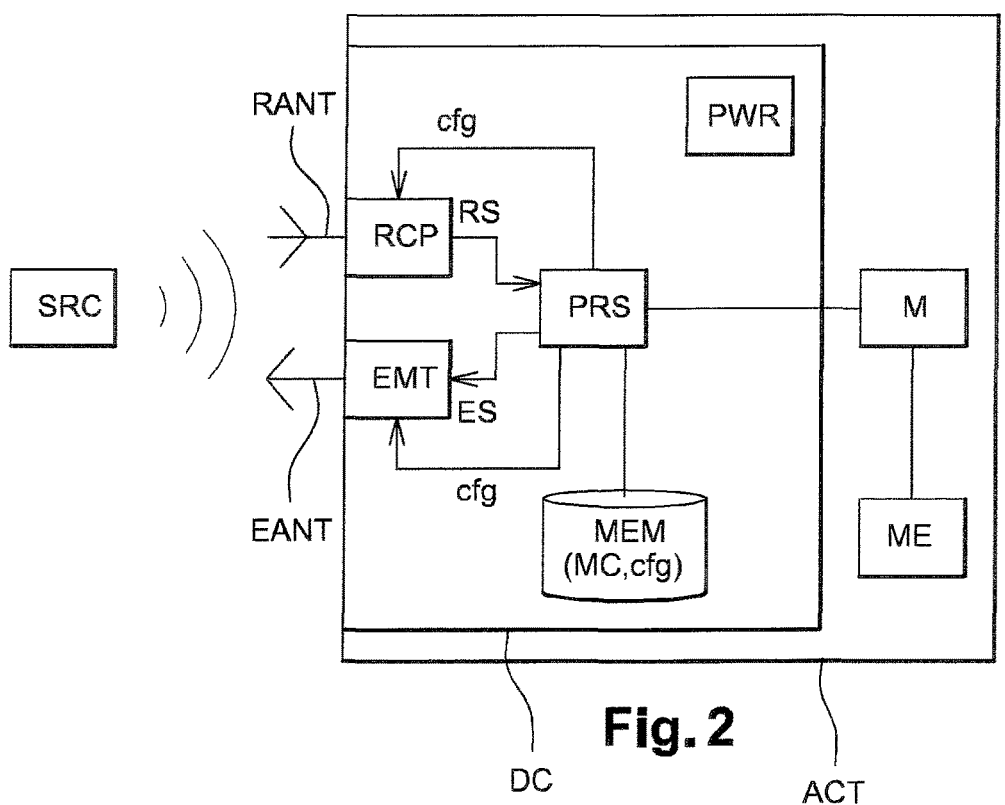
FIG. 2 is a representative diagram of a second embodiment of a device according to the invention integrated into an actuator of a building mobile equipment.
Figures 3, 4:
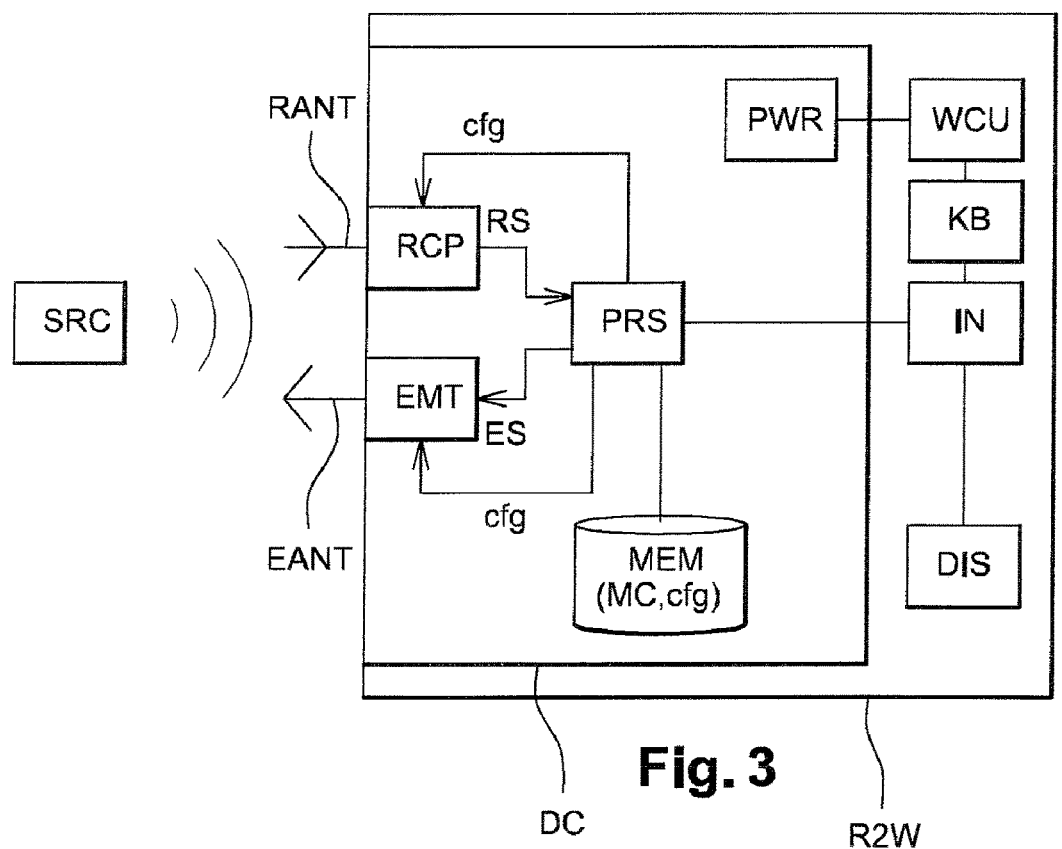
FIG. 3 is a representative diagram of a second embodiment of a device according to the invention integrated into a remote control allowing bidirectional communications.
FIG. 4 is a table illustrating different communication modes corresponding to distinct types of protocols and frequency bands.

We will now describe with reference to FIGS. 2 and 3 embodiments of the invention usable in the case of bidirectional communication modes, such as for example the communications modes using the Io-homecontrol® protocol.

According to a second embodiment shown in FIG. 2, the communication device DC comprises, in addition to the receiver RCP, an emission component EMT, associated with an emissing antenna EANT, the communication device DC being arranged to configure the emission component EMT when appropriate.

In this case, the communication device DC proceeds to the configuration of both its transmitter EMT and its receiver RCP in order to ensure a reception and an emission in (a) determined frequency band(s).

This communication device DC is integrated into an electromechanical actuator ACT. The actuator ACT comprises a motor M, a control unit which may be distinct or combined with the processing unit PRS, the control unit being arranged to control the motor M depending on the signals received by the receiver RCP according to the operational communication mode MUO.

According to a third embodiment shown in FIG. 3, the communication device DC comprises the same elements as in the second embodiment. The control device is integrated into a bidirectional remote control R2W. Such a remote control comprises a user interface IN comprising a control keyboard KB and possibly a screen DIS for displaying DIS to a user. These two elements can also be combined in the form of a touch screen.

The elements of the user interface IN are connected to the processing unit PRS.

The remote control can also comprise a wake-up control unit WCU, which aims at activating the processing unit PRS, the radio-frequency transmitter EMT, and the receiver RCP when a key of the keyboard is pressed, by connecting these elements to the power supply unit PWR.

These arrangements allow consuming energy only when a control signal must be emitted. The reception means are generally active only for a short period of time after the emission of a signal by the emission component, in order to collect a signal emitted in response by the device recipient of the control signal.

Within the scope of the implementation of the configuration functioning mode F1 of a device according to the invention, it may thus be necessary to provide the actuation of a specific key by the user in order to "wake up" the remote control R2W and therefore allow the power supply of the processing unit PRS and the receiver RCP by the power supply unit PWR.

A signal should be then provided to the reception means RCP in order to allow recognition of the configuration communication mode.

This signal can be emitted by a source SRC comprising for example a configuration tool as described above.

Regarding the realization of the transmitter, the processing unit and possibly the receiver contained in the device, it appears that these different elements may be contained on a same printed circuit, or realized separately.

The functions described above, namely in particular, the demodulation of the signals (for example RF signals), the decoding/checking of the frame format, the definition of the operational communication mode, the interpretation of the received signals as control signals, can be realized in a one-circuit configuration which comprises a sub-set dedicated to the communication functions (in particular RF), a wired logic optional part and a processor, or even a two-circuit configuration comprising, for example:

a first circuit comprising the communication functions and a wired logic part, and a second circuit comprising the processor, or even a first circuit comprising the communication functions and a second circuit comprising a wired logic part and the processor, or even a first circuit comprising the communication functions and a second circuit comprising the processor.

It appears that the decoding and checking operations of the error code can be achieved by the reception component, by a wired logic circuit part or by a generic processor.

It should be noted that the use of the devices according to the invention does not complicate the manufacture and calibration process of the devices. In particular, during the validation of a device on a given frequency, an adjustment of the functioning frequency is achieved by modifying the configuration of a quartz present in the receiver component.

Obviously, it appears that the different embodiments detailed above only constitute examples of implementations of the invention as defined by the appended claims. Alternatives of these different embodiments can be considered and the different described embodiments can be easily combined by those one skilled in the art.

The invention claimed is:

1. A functioning method of a communication device for the remote controlling of an actuator for a building mobile equipment comprising:

a) receiving with the communication device a first signal as determined in a configuration communication mode;

b) defining an operational communication mode depending on at least part of the content of the first received signal;

c) receiving a second signal as defined in the operational communication mode;

d) interpreting the second received signal in conformity with the operational communication mode, so as to identify control data in the second receiving signal;

wherein the definition of the operational communication mode comprises a step of downloading defining parameters for defining the operational mode of communication; or wherein the definition of the operational communication mode comprises a step of downloading of a software component intended to the interpretation of the operational communication mode;

a') Selecting a particular configuration communication mode from among a plurality of configuration communication modes usable by the communication device, b') Waiting for the reception of a signal during a determined time interval, c') If no signal is received within the determined time interval, returning to step a') of selecting a particular communication mode by selecting another configuration communication mode from among the plurality of configuration communication modes usable by the communication device.

2. The method according to claim 1, wherein several configuration communication modes are usable by the communication device, and wherein a listening of received signals according to the plurality of usable configuration communication modes is performed.

3. The method according to claim 1, wherein the determination of the configuration communication mode for the configuration device comprises:

d') If a signal is received within the determined time interval, proceeding in an attempt to interpret the received signal according to the selected configuration communication mode;

e') If the received signal is compliant with the selected configuration communication mode, defining said selected configuration communication mode as a determined configuration communication mode of the device;

f) If the received signal is not compliant with the selected communication mode, returning to step a') of selecting a particular configuration communication mode by selecting another configuration communication mode from among the plurality of configuration communication modes usable by the communication device.

4. The communication device for the remote control of an actuator for a building mobile equipment comprising a receiver and a data processing unit intended to receive a signal from the receiver and to process this received signal in conformity with a communication mode, the communication device being arranged to implement a method according to claim 1.

5. The device according to claim 4, wherein the processing unit is arranged to configure the receiver so as to allow reception in a determined frequency band.

6. The device according to claim 4 comprising a transmitter, the processing unit being arranged to configure the transmitter where appropriate.

7. The bidirectional remote control for the remote control of an actuator for a building mobile equipment comprising a communication device according to claim 6.

8. The electromechanical actuator for a building mobile equipment comprising a communication device according to claim 4, and a motor, a control unit which be distinct or combined with the processing unit, the control unit being arranged to control the motor depending on the received signals by the receiver according to the operational communication mode.

9. A configuration method of a communication device for the remote control of an actuator for a building mobile equipment comprising:

a") defining an operational communication mode to be used by the communication device for the remote control of the actuator;

b") generating at least one signal according to a determined configuration communication mode, the content of which comprises information related to the operational communication mode to be used by the communication device;

wherein step b") of generating the signal according to the determined configuration communication mode comprises a sub-step of downloading defining parameters for defining the operational communication mode;

or wherein step b") of generating the signal according to the determined configuration communication mode comprises a sub-step of downloading a software component intended to the interpretation of the operational communication mode;

a') Selecting a particular configuration communication mode from among a plurality of configuration communication modes usable by the communication device, b') Waiting for the reception of a signal during a determined time interval, c') If no signal is received within the determined time interval, returning to step a') of selecting a particular communication mode by selecting another configuration communication mode from among the plurality of configuration communication modes usable by the communication device.

10. The method according to claim 9, wherein the generated signal according to the determined configuration communication mode comprises the characteristics of the operational communication mode, and in particular the frequency band to be used and the type of communication protocol.

11. The method according to claim 9, comprising
a sub-step of receiving a third signal comprising a list of the operational communication modes likely to be implemented by the communication device; and
a sub-step of emitting a fourth signal containing an indication of selection of the operational communication mode in the list of the operational communication modes likely to be implemented by the communication device.

12. The method according to claim 9, wherein a step of determining a configuration communication mode is performed.

13. The configuration tool of a communication device for the remote control of an actuator for a building mobile equipment, the configuration tool being arranged for the implementation of a configuration method according to claim 9, and comprising a transmitter and a processing unit.

* * * * *